United States Patent [19]

Papanu

[11] 4,219,437
[45] Aug. 26, 1980

[54] COPOLYMERS OF KETO DICARBOXYLATES

[75] Inventor: Victor D. Papanu, Maryland Heights, Mo.

[73] Assignee: Monsanto Company, St. Louis, Mo.

[21] Appl. No.: 8,899

[22] Filed: Feb. 2, 1979

Related U.S. Application Data

[63] Continuation-in-part of Ser. No. 892,591, Apr. 3, 1978, Pat. No. 4,169,934.

[51] Int. Cl.$^2$ ................................................ C11D 7/26
[52] U.S. Cl. ...................... 252/174.21; 252/DIG. 11; 252/156; 528/222; 525/418
[58] Field of Search ............. 252/89 R, DIG. 11, 156; 528/222, 221; 560/180; 562/583; 525/418

[56] References Cited

U.S. PATENT DOCUMENTS 3,742,045  6/1973  Lannert ........................ 252/DIG. 11

Primary Examiner—Mayer Weinblatt
Attorney, Agent, or Firm—S. M. Tarter; E. P. Grattan; F. D. Shearin

[57] ABSTRACT

A detergent composition is provided which comprises at least 5 percent by weight of a surfactant selected from the group consisting of anionic, nonionic, zwitterionic, ampholytic and amphoteric surfactants; and at least 1 weight percent of a copolymer having the following general formula

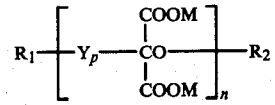

where Y is one or more comonomers selected from the group consisting of olefins and aldehydes having from 1 to about 3 carbon atoms; n averages at least 2; p is at least 1; and M is selected from the group consisting of alkali metal, ammonium and alkanol ammonium groups having 1 to about 4 carbon atoms in the alkyl chain; $R_1$ and $R_2$ are individually any chemically stable group which stabilize the polymer against rapid depolymerization in alkaline solution. The copolymers are stable under laundry use conditions, but depolymerize in acid media, making the fragments more readily biodegradable in waste streams.

14 Claims, No Drawings

COPOLYMERS OF KETO DICARBOXYLATES

CROSS REFERENCE TO RELATED APPLICATIONS

This Application is a continuation-in-part of application Ser. No. 892,591 filed Apr. 3, 1978, now U.S. Pat. No. 4,169,934.

BACKGROUND OF THE INVENTION

This invention relates to detergent compositions containing copolymers of keto dicarboxylates.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STP) has been found to be a highly efficient cleaning and detergent builder and this compound has been widely used for decades in cleaning and detergent formulations. Indeed, millions of pounds of STP are used each year in cleansing formulations because of its superior builder qualities. However, because of the recent emphasis on removing phosphates from detergent and cleaning compositions for environmental reasons, the detergent and cleaning industry is now looking for materials suitable for use as builders which do not contain phosphorus, and which are environmentally acceptable.

A large number of materials which do not contain phosphorus have been evaluated for use in detergent and cleaning formulations as a builder, but all of these materials suffer one or more disadvantages, usually either poor builder properties or poor biodegradability. As an example, U.S. Pat. No. 3,692,685 discloses salts of oxydisuccinic acid and carboxy methyl oxysuccinic acid as detergent builders and U.S. Pat. No. 3,708,436 discloses a mixture of polymeric maleic anhydride with sodium nitrilotriacetate or STP. Numerous U.S. patents, such as U.S. Pat. No. 3,704,320, disclose ether carboxylates as detergency builders and several references, such as U.S. Pat. No. 3,764,586 and U.S. Pat. No. 3,308,067, disclose polymeric, aliphatic polycarboxylic acids having certain specific structural relationships useful as builders.

Despite the advances taught in these and other references in the prior art to find a cleaning and detergency builder which does not contain phosphorus, all of these materials suffer from one or more disadvantages. Of the above-mentioned materials, those that are biodegradable are not equivalent to STP in builder performance, and those that are equivalent to STP in builder performance are usually biodegradable only with great difficulty. Inorganic builders other than STP are generally not satisfactory for use as a builder in detergent formulations because of their poor builder properties. Sodium aluminum silicates, commonly known as zeolites, have been proposed for use in detergent formulations since they are able to soften water by removing calcium ions; however, they are not very effective in removing magnesium ions from water. Moreover, it is clear that such water-insoluble, clay-like materials have the potential problem of producing a sediment in the cleaning solution and the resulting waste waters.

Thus, it can be seen that there is a need for a new class of materials with builder properties equivalent to STP, which does not contain phosphorus, which is water-soluble, and which achieves environmental acceptability by being readily biodegradable.

Such a class of materials and its use in detergent compositions has been disclosed in copending applications Ser. Nos.: 826,426 filed Aug. 19, 1977 now U.S. Pat. No. 4,146,495 issued Mar. 27, 1979; 826,425 filed Aug. 22, 1977 now U.S. Pat. No. 4,144,226 issued Mar. 13, 1979; 926,683 filed July 21, 1978 now abandoned in favor of Ser. No. 967,922 filed Dec. 11, 1978 and 974,667 filed Nov. 20, 1978. The polymeric acetal carboxylates described in the above applications were tested for sequestration function using the procedures described by Matzner et al in "Organic Builder Salts as Replacements for Sodium Tripolyphosphate", TENSIDE DETERGENTS, 10, No. 3, pages 119-125 (1973) and found to be equivalent or superior to STP. Thus, such polymeric acetal carboxylates were found to be superior detergent builders and were stable under home laundry use conditions, but depolymerized in acid media, making them more readily biodegradable.

Although satisfactory performance was achieved using the polymeric acetal carboxylates disclosed in the above-identified applications, there remains a need for new polymeric carboxylates in detergent formulations for specialized applications. Now, according to the present invention, there is provided a detergent composition utilizing a polymeric carboxylate that is structurally different from the polymeric carboxylates disclosed earlier, that is a functional replacement for STP in detergent formulations, and that will undergo biodegradation even more rapidly than the polymeric acetal carboxylates described in the above copending applications.

SUMMARY OF THE INVENTION

These and other advantages are achieved by a detergent composition comprising at least 5 percent by weight of a surfactant selected from the group consisting of anionic, nonionic, zwitterionic, ampholytic and amphoteric surfactants; and at least 1 percent by weight of a copolymer having the following general formula:

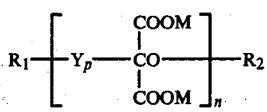

wherein Y is one or more comonomers selected from the group consisting of olefins and aldehydes having from 1 to about 3 carbon atoms; n averages at least 2; p is at least 1; $R_1$ and $R_2$ are individually any chemically stable group which stabilizes the polymer against rapid depolymerization in alkaline solution; and M is selected from the group consisting of alkali metal, ammonium and alkanol ammonium groups having from 1 to about 4 carbon atoms in the alkyl chain.

Broadly described, the copolymer of the present invention can be prepared by: (A) bringing together under polymerization conditions a diester of ketomalonic acid, one or more materials capable of polymerizing with the diester of ketomalonic acid, and a polymerization initiator; and (B) stabilizing the resulting polymer against rapid depolymerization in alkaline solution. To form an alkali metal salt of the copolymer, the stabilized copolymer can be saponified.

For the purposes of this invention, the term "rapid depolymerization in alkaline solution" as it is used in the specification and claims, shall mean that in an aqueous solution of 0.5 molar sodium hydroxide containing 10 grams per liter of the copolymer of the present invention, the average chain length of the copolymer will be reduced by more than 50 percent, as determined by Proton Magnetic Resonance, after 1 hour at 20° C. Furthermore, in writing the empirical formulas above, there is no implication as to the order in which the components appear, since the malonate moiety can be regularly or randomly placed along the polymer chain. Moreover, the copolymers described herein can be linear copolymers, or they may even be of a branched or crosslinked variety, as will occur to those skilled in the art in view of the present disclosure.

Any number of the diesters of ketomalonic acid known to those skilled in the art can be used to prepare the copolymers of the present invention. Suitable diesters include those having from 1 to about 4 carbon atoms in the ester, such as dimethyl, diethyl, methylbutyl, dipropyl and the like. Other diesters of ketomalonic acid can also be used, such as diisopropyl, methylpropyl, ethylpropyl, methylisopropyl, ethylisopropyl, dibutyl, methylbutyl, ethylbutyl, propylbutyl and the like, provided that the particular diester does not interfere with the polymerization, or cause the copolymer of the present invention to undergo rapid depolymerization in alkaline solution, and such diesters of ketomalonic acid are equivalent for purposes of this invention. Dimethyl ketomalonate and diethyl ketomalonate are preferred.

Any number of comonomers known to those skilled in the art can be polymerized with the diester of ketomalonic acid to form the copolymer of the present invention. It is only necessary that the comonomer will polymerize with the ketomalonate and does not cause the copolymer of the present invention to depolymerize in alkaline solution. Suitable comonomers include: olefins, such as ethylene, propylene and the like; aldehydes, such as formaldehyde and the like. Comonomers having one or two carbon atoms, such as ethylene or formaldehyde, are preferred.

Mixtures of comonomers can be polymerized with the diester of ketomalonic acid to form a terpolymer, or even a more complex polymeric structure. For example, mixtures of the same class of comonomers, such as a mixture of olefins like ethylene and propylene, can be copolymerized with the diester of ketomalonic acid to form a terpolymer. Even comonomers that might inhibit polymerization when used alone, such as a ketone like acetone, can be mixed with formaldehyde or ethylene, and be polymerized with the diester of ketomalonic acid to form a terpolymer wherein each comonomer is randomly dispersed along the polymer chain. Numerous other examples will occur to those skilled in the art in view of the present disclosure, such as a mixture of ethylene or formaldehyde and an acetal carboxylate having the general formula

wherein E is an alkyl group having 1 to about 4 carbon atoms, can be polymerized with the diester of ketomalonic acid to form a terpolymer wherein the

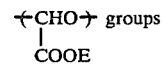

are randomly dispersed along the polymer chain.

Any number of initiators can be used for the polymerization. Nonionic or ionic initiators provide satisfactory results. Suitable initiators include: amines, such as triethyl amine, 2-hydroxy pyridine-$H_2O$ complex and the like. Even traces of hydroxy ion or cyanide ion will trigger the polymerization. Sodio derivatives such as diethylsodiomalonate or sodiomethylmalonate esters and the like have been used with good results.

As will occur to those skilled in the art in view of the present disclosure, the number of carboxylate groups in the copolymer of the present invention is important since the number of carboxylate groups affect the usefulness of the copolymer as a chelant, sequestrant, and detergent builder. Since the diester of ketomalonic acid is difficult to polymerize alone to form a homopolymer, the ketomalonate is usually flanked in the copolymer of the present invention by a comonomer. Hence, the nature of the comonomer or comonomers (i.e., the nature of Y), the mole ratio of comonomer to ketomalonate (i.e., the value of p) and the number of repeating units in the copolymer of the present invention (i.e., the average value of n) are each interrelated and important since they affect the number of carboxylate groups in the copolymer.

As noted above, the diester of ketomalonic acid can be polymerized with any number of comonomers, or even a mixture of comonomers, but as will occur to those skilled in the art, large comonomers, or mixtures of comonomers, that disperse the ketomalonate groups along the polymer chain too widely, or inhibit chelation by steric hindrance of the carboxylate groups on the ketomalonate, decrease the effectiveness of the copolymer as a sequestrant, chelant and builder. This decrease in effectiveness may be partially offset if the comonomer, or one of the comonomers, contains a carboxylate group (e.g., acetal carboxylate). Hence, it is preferred to use a relatively small comonomer that does not disperse the carboxylate groups too widely or inhibit chelation by steric hindrance, such as ethylene or formaldehyde.

The number of repeating units, i.e., the average value of n, in the copolymer of the present invention is important, since the effectiveness of the copolymer as a chelant, sequestrant and cleaning and detergency builder is affected by the average chain length. Even when the copolymer averages only two repeating units (i.e., n averages 2), the copolymer shows some effectiveness as a sequestrant, chelating agent and builder. Although there is no upper limit to the desired number of repeating units, which may average as high as 400, or even higher, there does not seem to be an advantage to having a copolymer with an average of more than about 200 repeating units. When the average number of repeating units exceeds about 100, significant improvement in sequestration, chelation and builder properties is not observed. Thus it is preferred that the copolymer of the present invention contain an average between about 10 and about 200 units, and even more preferred that the copolymer contains an average between about 10 and about 100 repeating units in the chain.

The mole ratio of comonomer to the diester of ketomalonic acid (i.e., the value of p) is also important. At mole ratios of comonomer to ketomalonate of less than 1:1, the copolymer forms shorter chains since the ketomalonate is difficult to homopolymerize than if the mole ratios were 1:1 or higher. Although there is no upper limit to the mole ratio of comonomer to ketomalonate, it is preferred to use a mole ratio of comonomer to ketomalonate of about 1:1 to about 5:1 (i.e., p is at least 1, and preferably p averages between 1 and about 5), and even more preferred to use a mole ratio of comonomer to ketomalonate of about 1:1 to about 2:1, say about 1.5:1 (i.e., p averages between 1 and about 2).

Other important factors believed to control the chain length of the copolymer include: (1) the initiator concentration, (2) the temperature of the polymerization, (3) the purity of the starting materials, and (4) the presence of solvents and their levels. As will occur to those skilled in the art, the concentration of the initiator, solvents and their levels, and the temperature of the polymerization reaction are all interrelated and the desired chain length can easily be controlled by simple experimentation by controlling these variables.

After the diester of ketomalonic acid has been polymerized with a comonomer as discussed above, any number of chemically reactive groups can be added to the copolymer termini, preferably using an ionic catalyst such as boron trifluoride etherate, trifluoroacetic acid, sulfuric acid, potassium carbonate, and the like. It is only necessary that the chemically reactive group stabilizes the copolymer against rapid depolymerization in an alkaline solution, and the specific nature of the chemically reactive group is not important in the proper function of the copolymer in its intended use. As an example, suitable chemically stable end groups include stable substituent moieties derived from otherwise stable compounds, such as: alkanes, such as methane, ethane, propane, butane and higher alkanes such as decane, dodecane, octadecane and the like; alkenes such as ethylene, propylene, butylene, decene, dodecene and the like; branched chain hydrocarbons, both saturated and unsaturated, such as 2-methyl butane, 2-methyl butene, 4-butyl-2,3-dimethyl octane and the like; cycloalkanes such as cyclohexane and cyclohexene and the like; haloalkanes such as chloromethane, chlorobutane, dichloropentane and the like; alcohols such as methanol, ethanol, 2-propanol, cyclohexanol, sodium phenate and the like; polyhydric alcohols such as 1,2-ethane diol, 1,4-benzene diol and the like; mercaptans such as methane thiol, 1,2-ethanedithiol and the like; ethers such as methoxyethane methyl ether, ethyl ether, ethoxy propane and cyclic ethers such as ethylene oxide, epichlorohydrin, tetramethylene oxide and the like; and carboxylate-containing compounds such as the alkali metal salts of carboxylic acids, the esters of carboxylic acids and the anhydrides. The above listing is intended to be instructive and is not intended to be limited since other chemically stable end groups that stabilize the polymer against rapid depolymerization in an alkaline solution will occur to those skilled in the art in view of the present disclosure.

Particularly suitable end groups include alkyl groups, alkyl groups containing oxygen and cyclic alkyl groups containing oxygen such as oxyalkyl groups like methoxy, ethoxy and the like; carboxylic acids such as

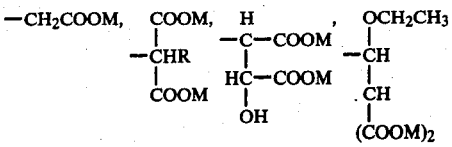

and the like; aldehydes, ethers and other oxygen-containing alkyl groups such as

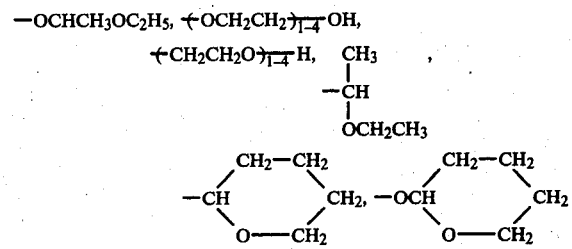

and the like. In the above examples of suitable end groups, M is alkali metal, ammonium, alkanol ammonium, alkyl group of 1 to 4 atoms, and R is hydrogen or alkyl group of 1 to 8 carbon atoms. As will occur to those skilled in the art in light of the present disclosure, the chemically stable end groups at the copolymer termini can be alike or unlike.

In one embodiment of this invention, diethyl-sodiomalonate or sodiomethylmalonate is used as an initiator to form the copolymer. These compounds not only initiate the polymerization, but also the ester adds to the termini as one of the chemically stable end groups to stabilize that end of the copolymer against rapid hydrolysis in an alkaline solution. These compounds can be prepared from the corresponding esters using sodium hydride in a solvent, such as tetrahydrofuran, by techniques known to those skilled in the art.

The stabilized copolymer ester is useful as an intermediate to prepare the corresponding alkali metal, ammonium or alkanol ammonium salts. It is only necessary to react the stabilized copolymer ester with a strong base, such as lithium hydroxide, sodium hydroxide, potassium hydroxide, or mixtures thereof, using conventional saponification techniques to make a salt suitable for use as a builder and as a sequestrant. The ammonium or alkanol ammonium salts can be prepared from the alkali metal salts using conventional ion exchange techniques.

The amount of copolymer salt required to effectively complex the ions in a given system will depend to some extent on the particular copolymer salt being used and the particular metal or alkaline earth metal ion in the aqueous media. Because the copolymer of the present invention tends to depolymerize in acid media, effective complexing is limited to neutral or preferably basic solution. Optimum conditions and amounts of the copolymer salt to be used can readily be determined by routine experimentation.

The copolymer salts of the present invention are also useful as builders in detergent formulations. Since the pH of a detergent solution is usually between pH 9 and pH 10, the copolymers of the present invention will not depolymerize rapidly when used as a detergent builder in aqueous solution at normal use concentrations (~250 ml./washer), temperatures (10°-60° C.) and times (i.e., about 15 minutes) typical of United States home laundry practices. Generally, the use of the alkali metal salts, particularly the sodium salt, is preferred. However, in some formulations where greater builder solubility is required, the use of ammonium or alkanol ammonium salts may be desirable.

The detergent formulations will contain at least 1 percent by weight and preferably at least 5 percent by weight of the copolymer salts of this invention. In order to obtain the maximum advantages of the copolymers of this invention as builders, the detergent should preferably contain from about 5 percent to about 75 percent of these salts. The copolymer salts of this invention can be the sole detergency builder, or the copolymer salts can be utilized in combination with other detergency builders which may constitute from 0 to 95 percent by weight of the total builders in the formulation. By way of example, builders which can be employed in combination with the copolymer salts of this invention include either water insoluble materials, such as sodium alumino silicates, commonly known as zeolites, or water soluble inorganic builder salts such as alkali metal polyphosphates, i.e., the tripolyphosphates and pyrophosphates, alkali metal carbonates, borates, bicarbonates and silicates and water soluble organic builders, including amino polycarboxylic acids and salts, such as alkali metal nitrilotriacetates, cycloalkane polycarboxylic acids and salts, ether polycarboxylates, alkyl polycarboxylates, epoxy polycarboxylates, tetrahydrofuran polycarboxylates, such as 1,2,3,4 or 2,2,5,5 tetrahydrofuran tetracarboxylates, benzene polycarboxylates, oxidized starches, amino(trimethylene phosphonic acid) salts, diphosphonic acid salts (e.g., the sodium salts of methylene diphosphonic acid or 1-hydroxy ethylidene 1,1-dimethylenephosphonic acid), and the like.

The detergent formulations will generally contain from 5 percent to 95 percent by weight total builder (although greater or lesser quantities may be employed if desired). The total amount of builder employed will be dependent on the intended use of the detergent formulation, other ingredients of the formulation, pH conditions, and the like. For example, general laundry powder formulations will usually contain from about 20 percent to about 60 percent builder; and machine dishwashing formulations will usually contain from about 60 percent to about 90 percent builder. Optimum levels of builder content as well as optimum mixtures of copolymer salts of this invention with other builders for various uses can be determined by routine tests in accordance with conventional detergent formulation practice.

The detergent formulations will generally contain a water soluble detergent surfactant, although the surfactant ingredient may be omitted from machine dishwashing formulations. Any water soluble anionic, nonionic, zwitterionic or amphoteric surfactant can be employed.

Examples of suitable anionic surfactants include soaps such as the salts of fatty acids containing about 9 to 20 carbon atoms, e.g., salts of fatty acids derived from coconut oil and tallow; alkyl benzene sulfonates—particularly linear alkyl benzene sulfonates in which the alkyl group contains from 10 to 16 carbon atoms; alcohol sulfates; ethoxylated alcohol sulfates, hydroxy alkyl sulfonates; alkyl sulfates and sulfonates; monoglyceride sulfates; acid condensates of fatty acid chlorides with hydroxy alkyl sulfonates; and the like.

Examples of suitable nonionic surfactants include alkylene oxide (e.g., ethylene oxide), condensates of mono- and polyhydroxy alcohols, alkyl phenols, fatty acid amides, and fatty amines; amine oxides, sugar derivatives such as sucrose monopalmitate; long chain tertiary phosphine oxides; dialkyl sulfoxides; fatty acid amides, (e.g., mono- or diethanol amides of fatty acids containing 10 to 18 carbon atoms); and the like.

Examples of suitable zwitterionic surfactants include derivatives of aliphatic quaternary ammonium compounds such as 3-(N,N-dimethyl-N-hexadecylammonio) propane-1-sulfonate and 3-(N,N-dimethyl-N-hexadecylammonio)-2-hydroxy propane-1-sulfonate.

Examples of suitable amphoteric surfactants include betains, sulfobetains and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkyl benzene sulfonates, are preferred for use in general laundry formulations, whereas low foaming nonionic surfactants are preferred for use in machine dishwashing formulations.

The quantity of surfactant employed in the detergent formulations will depend on the surfactant chosen and the end use of the formulation. In general, the formulations will contain from 5 percent to 50 percent surfactant by weight, although as much as 95 percent or more surfactant may be employed if desired. For example, general laundry powder formulations normally contain 5 percent to 50 percent, preferably 15 percent to 25 percent surfactant. Machine dishwashing formulations normally contain about 0.5 percent to about 5 percent surfactant. Liquid dishwashing formulations normally contain about 20 percent to about 45 percent surfactant. The weight ratio of surfactant to builder will generally be in the range of from 1:12 to 2:1.

In addition to builder and surfactant components, detergent formulations may contain fillers such as sodium sulfate and minor amounts of bleaches, dyes, optical brighteners, soil anti-redeposition agents, perfumes, and the like.

In machine dishwashing compositions, the surfactant will be a low-foaming anionic surfactant which will constitute 0 to 5 percent of the formulation.

It is to be noted that when the alkali metal, ammonium or alkanol amine salts of the present invention are used as builders, they will be used generally in an alkaline medium. When the copolymers of the present invention are used at a pH of 7 or below, the copolymer depolymerizes. Thus, the copolymers of the present invention when used as builders will be effective for chelating, sequestering and as detergency and cleaning builders, but when an aqueous solution containing the copolymer is discharged into a sewer or other waste water system, the copolymer will soon depolymerize into small fragments which are readily biodegradable.

DESCRIPTION OF THE PREFERRED EMBODIMENTS

This invention is illustrated by, but not limited to, the following Examples wherein all percentages are by weight unless otherwise noted.

EXAMPLE I

To a 50 milliliter single-necked, round-bottomed reaction flask equipped with a magnetic stirrer was added 10 grams (0.1 mole) of dimethyl ketomalonate and 4 milliliters of methylene chloride. The temperature of the flask and the contents was lowered to about 0° C., 0.5 milliliter of 0.05 molar sodium diethyl methylmalonate was added, gaseous formaldehyde was bubbled into the contents, and polymerization began. The flask was kept in an ice bath, and when the temperature returned to 0°–2° C., (about 45 minutes), 0.18 milliliter trifluoroacetic acid (1.5 mole percent) and 3.5 milliliters of ethyl vinyl ether was added to the mixture. The mixture was stirred at room temperature overnight. About 2 milliliters of 1 molar NaOH solution was added to the mixture and the volatiles were removed under vacuum. Then 12 milliliters of 5 molar NaOH were added. The mixture was stirred at about 0° C. for about 2 hours and then allowed to warm to room temperature. The precipitate which formed upon the addition of the 5 molar NaOH was recovered by filtration and dried. The precipitate was then redissolved in distilled water, precipitated into methanol, stirred and recovered by filtration. The yield was about 74.8 percent. Analysis of the product, including the chain length, by Proton Magnetic Resonance (PMR) Spectra Analysis and Carbon-13 Nuclear Magnetic Resonance Analysis, indicated that the copolymer contained an average of about 16 $-(CH_2O)-$ units per chain, and an average of about 10 to 16

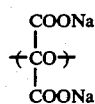

units per chain, to provide a mixture, mostly a copolymer having the following formula:

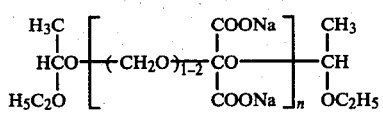

with a minor amount of a copolymer having the following formula:

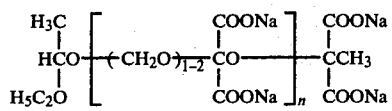

wherein n averages about 13.

EXAMPLE II

A portion of the copolymer prepared in Example I was tested for sequestration function using the procedures described by Matzner et al ("Organic Builder Salts as Replacements for Sodium Tripolyphosphate", TENSIDE DETERGENTS, 10, no. 3, pages 119–125) 1973. The sequestration of calcium ions and magnesium ions (as a percent of STP performance) indicated that the copolymer had a sequestration performance of about 80 percent of STP.

EXAMPLE III

The biodegradation of a portion of the copolymer from Example I was measured by diluting one part of an activated sewerage sludge with about 10 parts of river water, and adding a known amount of the copolymer to the diluted sludge. The biodegradation was determined by measuring the carbon dioxide evolution from the diluted sludge. After 30 days about 99 percent of the carbon dioxide from the theoretical amount available was evolved, indicating that the copolymer was readily biodegradable.

EXAMPLE IV

A detergent composition is prepared by admixing 20 parts by weight of a linear alkylbenzene sulfonate containing an average of about 12 carbon atoms in the alkyl chain, 30 parts by weight of the copolymer of Example I, 15 parts by weight of sodium carbonate and 35 parts by weight of sodium silicate. Swatches soiled with synthetic human sebum and particulate soils are washed in water containing 100 ppm hardness with a calcium to magnesium ratio of 3:2 and 1500 ppm of the detergent composition at about 60° C. for 10 minutes. For comparative purposes, similar swatches are washed using 1500 ppm of a commercial phosphate-containing detergent under the same conditions. After washing the swatches are read on a Gardner XL-23 Colorimeter, and the reflectance results indicate that the two detergent compositions are substantially equivalent.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A detergent composition comprising at least 5 percent by weight of a surfactant selected from the group consisting of anionic, nonionic, zwitterionic, ampholytic and amphoteric surfactants; and at least 1 weight percent of a copolymer having the following general formula:

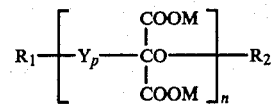

wherein Y is one or more comonomers selected from the group consisting of olefins and aldehydes having from 1 to about 3 carbon atoms; n averages at least 2; p is at least 1; $R_1$ and $R_2$ are individually any chemically stable group which stabilize the polymer against rapid depolymerization in alkaline solution; and M is selected from the group consisting of alkali metal, ammonium and alkanol ammonium groups having from 1 to about 4 carbon atoms in the alkyl chain.

2. A detergent composition of claim 1 wherein the copolymer comprises from about 5 to about 95 weight percent of the detergent composition.

3. A detergent composition of claim 1 wherein the copolymer comprises from about 5 to about 75 weight percent of the detergent composition.

4. A detergent composition of claim 1 wherein n averages between 10 and about 200.

5. A detergent composition of claim 1 wherein n averages between about 10 and about 200.

6. A detergent composition of claim 5 wherein p averages between 1 and about 5.

7. A detergent composition of claim 1 wherein Y is selected from the group consisting of

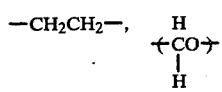

and mixtures thereof.

8. A detergent composition of claim 7 wherein Y is

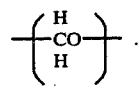

9. A composition of claim 1 wherein $R_1$ and $R_2$ are individually selected from the group consisting of alkyl and cyclic alkyl groups containing oxygen.

10. A detergent composition of claim 1 wherein $R_1$ is selected from the group consisting of $-OCH_3, -OC_2H_5, HO(CH_2CH_2O)\overline{{}_{1\text{-}4}}^-$,

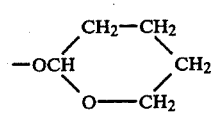

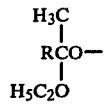

and mixtures thereof and $R_2$ is selected from the group consisting of $-CH_3, -C_2H_5,$

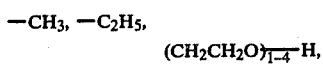

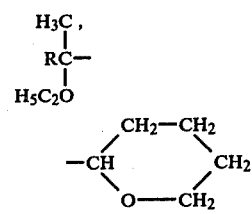

and mixtures thereof, wherein R is hydrogen or alkyl having 1 to 8 carbon atoms.

11. A detergent composition of claim 10 wherein M is an alkali metal.

12. A detergent composition of claim 10 wherein M is sodium.

13. A detergent composition of claim 10 wherein n averages between 10 and 100, and p averages between 1 and about 5.

14. A detergent composition of claim 13 wherein M is sodium, $R_1$ is

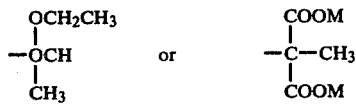

or mixtures thereof, and $R_2$ is

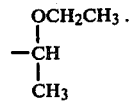

* * * * *